United States Patent [19]

Fujimoto

[11] Patent Number: 5,254,412
[45] Date of Patent: Oct. 19, 1993

[54] HEAT RESISTING ADHESIVE MATERIAL

[75] Inventor: Masao Fujimoto, Minatoiimanaka, Japan

[73] Assignee: National Starch and Chemical Investment Holding Corporation, Wilmington, Del.

[21] Appl. No.: 884,490

[22] Filed: May 15, 1992

[30] Foreign Application Priority Data

May 17, 1991 [JP] Japan .................. 3-142352

[51] Int. Cl.$^5$ .................................. B32B 27/08
[52] U.S. Cl. ................................... 428/473.5
[58] Field of Search .............. 428/473.5; 528/392, 528/127, 128, 126, 125; 549/303; 524/104

[56] References Cited

U.S. PATENT DOCUMENTS

| | | | |
|---|---|---|---|
| 3,845,018 | 10/1974 | Bilow et al. | 528/392 |
| 3,879,349 | 4/1975 | Bilow et al. | 528/127 |
| 4,097,456 | 6/1978 | Barie, Jr. | 428/473.5 X |
| 4,108,836 | 8/1978 | Bilow | 528/128 |
| 4,133,792 | 1/1979 | Antonoplos et al. | 524/104 |
| 4,218,555 | 8/1980 | Antonoplos et al. | 528/126 |
| 4,438,273 | 3/1984 | Landis | 549/303 |
| 4,485,231 | 11/1984 | Landis | 528/125 |
| 4,495,342 | 1/1985 | Landis | 528/125 |
| 4,921,745 | 5/1990 | Mitsui et al. | 428/423.5 X |

OTHER PUBLICATIONS

"A Multi-Purpose Thermoplastic Polyimide", A. K. St. Clair and T. L. St. Clair, *SAMPE Quarterly*, Oct. 1981.

"High Density Interconnect Packaging Of Integrated Circuits Using A Polyimide Dielectric Interlayer", R. D. Rossi, Reprinted from *Hybrid Circuit Technology*, Sep. 1989.

"Mechanical Properties of A New Polyimide Thin Film Dielectric Interlayer for Multichip Modules", R. D. Rossi & P. D. Machiesky, *Solid State Technology*, Feb., 1990.

"Polyimides", R. D. Rossi, ASM International ®, Reprinted from *Engineered Materials Handbook* ®, vol. 3: Adhesive and Sealants, 1991.

*Primary Examiner*—Thomas J. Herbert, Jr.
*Attorney, Agent, or Firm*—Ellen T. Dec

[57] ABSTRACT

A heat resistant adhesive material which comprises an aromatic polyimide supporting film wherein the main component of the film is a repeating unit of the general formula:

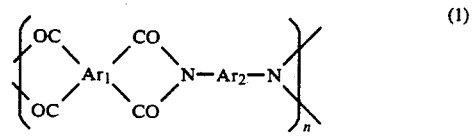

(1)

$Ar_1$ is an aromatic tetracarboxylic acid residue, $Ar_2$ an aromatic diamine residue, and n is an integer 1 or greater; at lease one side of which is coated with an adhesive layer wherein the main component of the adhesive is an acetylene terminated polyimide of the formula:

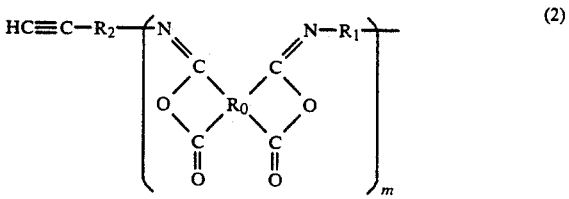

(2)

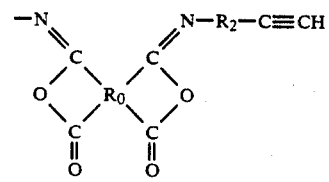

wherein $R_o$ represents tetravalent organic groups, $R_1$ and $R_2$ divalent organic groups, and m is an integer 0 or greater; or (Abstract continued on next page.)

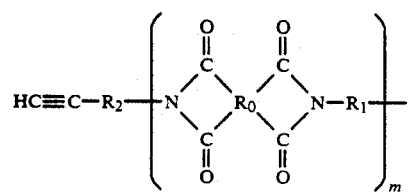
(3)
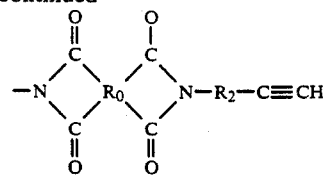
wherein $R_o$ represents tetravalent organic groups, $R_1$ and $R_2$ divalent organic groups, and m is an integer 0 or greater.
4 Claims, No Drawings

HEAT RESISTING ADHESIVE MATERIAL

This invention relates to heat resistant adhesive material employed for film or tape for bonding, repairing or insulation of electrical parts, electronic parts, and the like.

BACKGROUND OF THE INVENTION

As adhesive tape for fixing lead pins of a lead frame of a semiconductor device, adhesive tape, wherein polyacrylonitrile resin, epoxy resin, phenol resin, or acrylonitrile-butadiene resin adhesive layer is applied alone or in combination onto a supporting film such as polyimide, is used conventionally. Such adhesive tape is employed where low heat resistant property of adhesive does not cause trouble. However, in recent years advance within the technology in the semiconductor field, greater heat resistance has been required in the abovementioned adhesive. For example, when ceramic material is used as sealing material for semiconductor chips, glass that has low melting point is used for sealing by heating it to a temperature of 450° to 500° C. In this case, adhesives currently in use have problems of poor heat resistance, surface contamination of components due to gas produced during heating, and occurrence of pin holes from out-gassing of the low melting point glass part. Moreover, on exposure to high temperature, the adhesives lose most of their bonding strength to fix the lead pins and the deformation of the lead pins by heat occurs.

Technology for producing semiconductor devices has advanced at an everincreasing speed. Semiconductor devices are highly refined, and integrated, and propagation speed of signals in the semiconductor devices is accelerated more and more. With such advances, capacity, speed and compactness of each of computers from a super computer to a personal computer are being improved rapidly. Various kinds of electronics also have the same tendency as the computers. The abovementioned highly integrated and accelerated semiconductor devices can process more and more data, and accelerate propagation of signals in the devices. However, the propagation of signals between the devices is slow in ordinary nonintegrated packaging, which slows down the propagation speed of signals in the whole electronic system.

In order to improve performance, new technology such as multichip module, wherein plural semiconductor devices are put together on a substrate, finds practical use for speedy propagation of signals between semiconductor devices, and at the same time, for compact mounting of semiconductor devices.

For example, a multilayer interconnection substrate is constructed from copper, aluminum, or other conductor material and polyimide as insulator material. The multilayer interconnection substrate is required to have layer insulation property. A surface of the top layer where the interconnection of conductors is exposed is over-coated with polyimide precursor (polyamic acid) solution to prevent contamination caused by being exposed to air, and to prevent conductors from oxidating. Forming a protecting film on the top layer in this way not only costs more, but also makes the production process complex and less efficient.

It has been proposed to form the above-mentioned protection film by a process which comprises the steps of applying polyimide precursor solution as by a spin coater and conducting heat treatment at a high temperature of 300° to 350° C. in nitrogen flow, and also by a method using polyimide paste, which is prepared so that a screen printing is possible. Although the screen printing results in less wasted resin than the spin coat method, it is necessary in screen-printing to conduct a heat treatment at the high temperature of 350° C. in nitrogen flow. The films have also been produced by applying conventional low heat resistant adhesive on aromatic polyimide film to form an adhesive layer, and pasting it on the top layer of a multilayer interconnection substrate. However, just as in the case of the abovementioned ceramic packaging, this method also has a problem with respect to the heat resistance of the adhesive even though the polyimide film has heat resistant property. Thus, as yet there is no adequate adhesive film for producing multilayer interconnection substrate or for sealing by ceramic packaging.

Furthermore, when electronics are produced, semiconductor devices and multilayer interconnection substrates are subjected to heavy heat loads. For example, there are deposition of wiring metal such as aluminum and copper, die bonding, gold streak bonding, sealing by using low melting point glass or epoxy resin, soldering when said semiconductor devices are mounted to the electronics, etc. If the adhesive of the adhesive film employed in those processes could have excellent workability at low temperature and be able to adhere easily by low pressure, and could also have high heat resistance, reliability of the obtained electronics would be improved. Moreover, with improvement of heat resistance of the adhesive, it would be possible to adopt a new production process giving the electronics new characteristics, thereby providing added value and productivity to the electronics.

However, since the above-mentioned adhesives for general purpose such as polyacrylonitrile resin, and epoxy resin have low glass transition point, heat resistant adhesive strength cannot be expected at all. Therefore, to solve the problem in heat resistance, the Tg of adhesives must be raised. For example, in epoxy resin, by introducing a high heat resistant component into the molecular structure of the epoxy resin, selecting a main material with high crosslinking density and curing agent, and conducting heat curing at high temperature, the Tg can be raised and some degree of heat resistant strength can be achieved. However, even in such a method, adhesiveness is shown at a temperature around 200° C. at most, and cannot resist the temperature over 200° C. Also, for example, when adhesives currently in use are exposed to the temperature of 200° C. for a long period, or a high temperature of over 300° C. for a short period, heat deterioration or heat decomposition of the polymer itself is brought about, so that it is impossible to employ the adhesives currently in uses on the abovementioned condition.

Accordingly, if aromatic polyimide with high heat resistance could be used, the adhesive would be able to resist the heat history of over 200° C. for a long period, and the above-mentioned problem will be solved. However, for linear polyimide precursor (linear polyamic acid) conventionally in use wherein an aromatic ring is bonded at a conventional para position and the Tg is high, voids are liable to occur in the adhesive layer since water is eliminated when the linear polyimide precursor is changed to the imide, and complete elimination of solvent is difficult because the linear polyimide precursor dissolves only in high boiling point solvents and voids are liable to occur. Also, since the high Tg linear polyimide precursor is essentially non-thermoplastic, and not fluid when adhered, it is hard to employ it as an adhesive.

Further, a polyimide adhesive [SAMPE Quarterly, 1981, Vol. 13, page 20] has been proposed wherein the Tg of linear polyimide precursor which has an aromatic ring bonding at a meta position is lowered to 260° C. in order to introduce thermoplasticity, and hot melt type adhesion is conducted after being changed to imide in order to prevent occurrence of voids. This polyimide adhesive shows, for example, adhesive strength of over 100kgf/cm$^2$ even at a high temperature of 200° C. when iron is adhered to another iron, but requires a temperature over 320° C. as condition to conduct adhesion. Since the Tg is about 260° C., molecular chains are fluid and adhesive strength is very low when temperature is over 260° C.

Moreover, by using polyetherimide as adhesive, which is linear heat resisting polymer with low Tg (Tg=217° C.), the temperature required for bonding can be lowered because Tg is low. However, the lower the Tg is, the lower heat resistant adhesive strength is at high temperature.

Heat resistant adhesive material has been proposed which comprises applying polyimide added with thermoplasticity on one side or both sides of rigid nonthermoplastic polyimide film used for flexible print substrates. The heat resistant adhesive material is produced by applying thermoplastic polyimide precursor (polyamic acid) solution to non-thermoplastic polyimide film, drying up solvent of the solution, and heating it to the temperature over Tg of said thermoplastic polyimide precursor to thereby change it to imide.

Moreover, denatured polyimide, wherein flexible diamine with an aromatic ring bonding at a meta position and acid anhydride are substituted for rigid diamine of monomer with aromatic ring bonding at a para position and acid anhydride to thereby change a molecular structure of the above-mentioned linear polyimide and Tg is changed, loses its heat resisting adhesive strength at the temperature over Tg of this polyimide. Also, when conducting adhesion, a temperature higher than Tg by about 50° to 100° C. is needed and high pressure is required because melt viscosity gets higher when pressing.

It is therefore an object of the present invention to provide adhesive material which can adhere at low temperature and by low pressure, and at the same time, have excellent heat resisting bonding strength.

SUMMARY OF THE INVENTION

In accordance with the invention, the above-mentioned object can be accomplished by providing a heat resistant adhesive material which comprises an aromatic polyimide supporting film wherein the main component of the film is a repeating unit of the general formula:

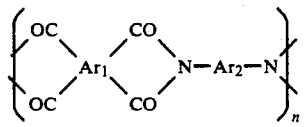

wherein $Ar_1$ is an aromatic tetracarboxylic acid residue, $Ar_2$ an aromatic diamine residue, and n is an integer of 1 or greater; at least one side of which is coated with an adhesive layer wherein the main component of the adhesive is an acetylene terminated polyimide of the formula:

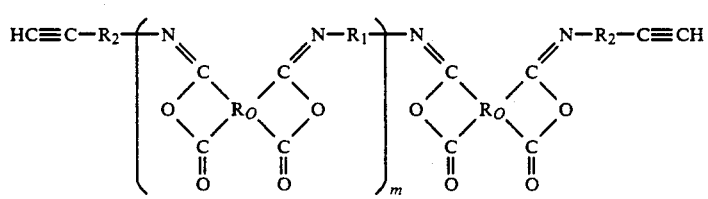

wherein $R_o$ represents tetravalent organic groups, $R_1$ and $R_2$ divalent organic groups, and m is an integer O or greater; or

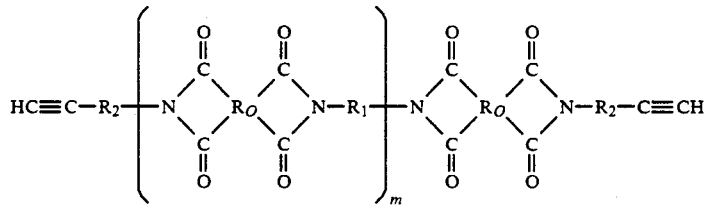

wherein $R_o$ represents tetravalent organic groups, $R_1$ and $R_2$ divalent organic groups, and m is an integer O or over O.

In the description, the expression "main component" includes the case wherein the entire compound is composed only of the main component.

DETAILED DESCRIPTION OF THE INVENTION

The heat resistant adhesive material of the present invention is either a two-layer structure comprising an aromatic polyimide supporting film and a adhesive layer wherein the main component is acetylene terminated polyimide which is to be formed on the one side of said aromatic polyimide supporting film, or a three-layer structure comprising an aromatic polyimide supporting film and an adhesive layer wherein the main component is acetylene terminated polyimide which is to be formed on the both sides of said aromatic polyimide supporting film.

The above-mentioned aromatic polyimide supporting film is thermoplastic or non-thermoplastic polyimide film wherein the main component is repeating unit shown as the below-mentioned general formula (1), and obtained by reacting various kinds of acid anhydride with diamine:

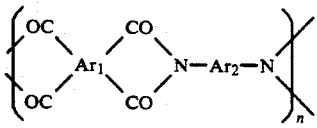

wherein $Ar_1$ is an aromatic tetracarboxylic acid residue, $Ar_2$ an aromatic diamine residue, and n is an integer 1 or above.

To be more concrete, $Ar_1$ in the above-mentioned formula (1) is one of the following:

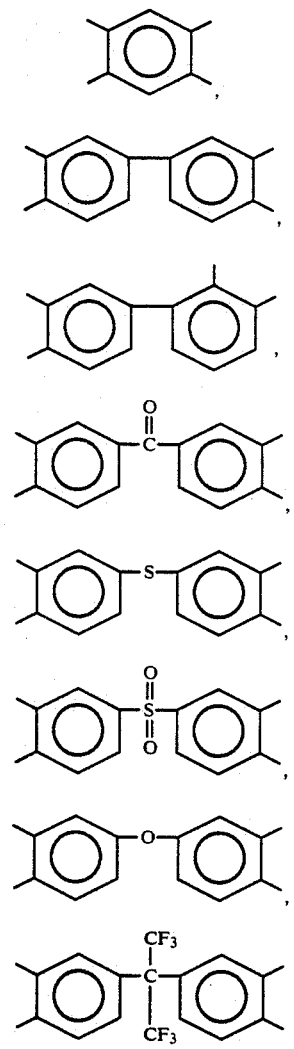

As the above-mentioned acid anhydride, there are rigid monomers wherein aromatic rings are bonded at a para position and many parts in the molecular structure are planar such as pyromellitic acid dianhydride, and 3,3',4,4'biphenyltetracarboxylic acid dianhydride. By employing them, more rigid nonthermoplastic polyimide film which has higher Tg, and smaller coefficient of thermal expansion can be obtained. Also, other than the above-mentioned monomers, there are monomers wherein aromatic rings are bonded at a meta position or with groups such as ether, ketone, and oxygen which make it possible for aromatic rings to rotate. For example, these are 2,3,3',4', -benzophenonetetracarboxylic acid dianhydride, and the like. By employing them, thermoplastic polyimide film which has lower Tg can be obtained. Moreover, when dielectric constant which is lower than usual dielectric constant of polyimide (about 3.5) is needed, it is preferable to use 2,2-bis(3,4-dicarboxyphenyl)hexafluoropropane dianhydride, and the like which contain siloxane diamine or fluorine.

As the above-mentioned diamine, there are included the following:

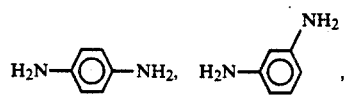

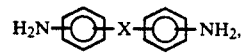

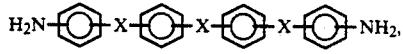

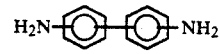

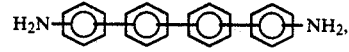

wherein

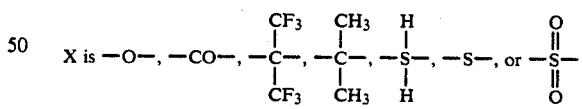

and each X can be either same or different.

The above-mentioned polyimide supporting film maybe, for example, prepared as follows. Acid anhydride and diamine of approximately the same moles are reacted in an organic solvent to prepare polyamic acid (polyimide precursor) solution. The polyamic acid solution is streamed and applied by the appropriate thickness onto a glass plate, or a metallic plate such as a mirror finished surface made of stainless steel, dried to volatilize the solvent, and then peeled from the plate substrate to obtain polyamic acid film. Next, the temperature of the polyamic acid film is raised higher than Tg of the desired polyimide supporting film, and by dehydrating and imidizing the polyimic acid film, the polyimide supporting film is prepared. Moreover, it is possible to conduct drawing treatment to the polyimide supporting film prepared as above to thereby improve its material property.

When preparing said polyamic acid, bulking agent such as aluminum, alumina, and silica powder can be mixed with the polyimide supporting film within the range of 0.1 to 100% by weight to the polyimide supporting film.

Suitable aromatic polyimide supporting film may also be obtained from Du Pont Co. under the trademark Kapton; from Kanegafuchikagakukogyo under the name Apikal; Ubekosan under the name Upilex R and Upilex S and Mitsubishikasei under the names PI-2080 and Novax. Also useful are thermoplastic polyimide films Larc-TPI film and NEW-TPI film available from Mitsuitoatsu.

The thickness of the polyimide supporting film is not particularly limited, and they are generally available as 7.5 μm, 12.5 μm, 25 μm, 50 μm, 75 μm, or 135 μm.

In order to improve the adhesiveness to the acetylene terminated polyimide adhesive layer, it is possible to treat one or both surfaces of the polyimide film with conventional treatments such as corona treatment, oxygen plasma treatment, sputtering treatment, metallic sodium treatment or by applying thin acetylene terminated polyimide adhesive solution as primer.

The adhesive which is used for the adhesive layer comprises, as its main component, acetylene terminated polyimide, a cyclic polyimide or polyisoamide obtained by reacting aromatic acid anhydride, aromatic diamine, and ethynylated aromatic amine. Suitable adhesives are represented by the formula:

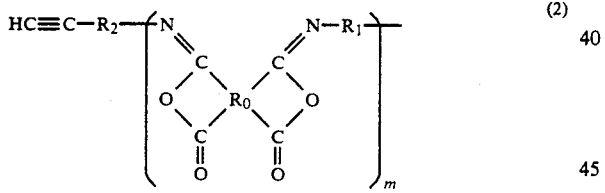
(2)

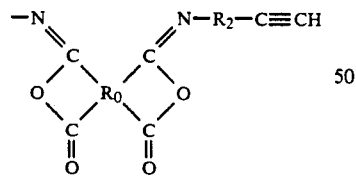

wherein $R_o$ represents tetravalent organic groups, $R_1$ and $R_2$ divalent organic groups, and m is an integer O or greater; or

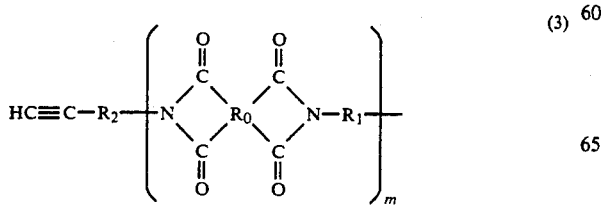
(3)

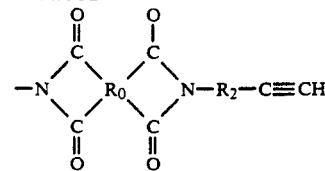

wherein $R_o$ represents tetravalent organic groups, $R_1$ and $R_2$ divalent organic groups, and m is an integer O or greater.

As $R_o$ in the general formula (2), and (3) are included, for example, the following organic groups:

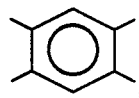,

,

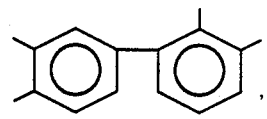,

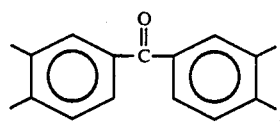,

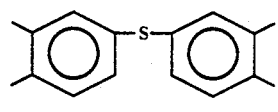,

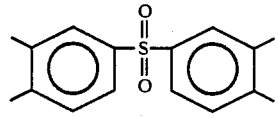,

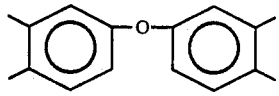,

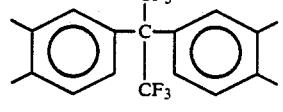

As $R_1$ in the general formula (2), and (3), organic groups of the following structural formulas are preferred:

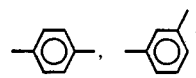,

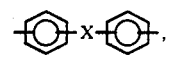,

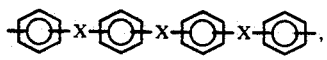

wherein chemical formula,

X is $-O-$, $-CO-$, $\begin{array}{c}CF_3\\|\\-C-\\|\\CF_3\end{array}$, $\begin{array}{c}CH_3\\|\\-C-\\|\\CH_3\end{array}$, $\begin{array}{c}H\\|\\-S-\\|\\H\end{array}$, $-S-$, or $\begin{array}{c}O\\\|\\-S-\\\|\\O\end{array}$, and each X can be either same or different.

$R_2$ in the above-mentioned general formula (2), and (3) indicates divalent compounds wherein an amino group and an ethyl (acetylene) group are linked with an aromatic ring, and is shown as the following structural formulas, for example:

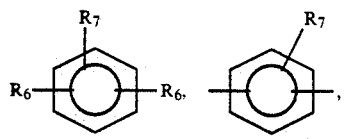

wherein $R_6$ is an alkylene group with 1 to 20 carbon atoms, an alkylene fluoride group, or a phenylene group and $R_7$ is H, an alkyl fluoride group, an acyl group, or a halogen group. The structure

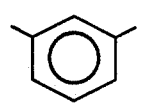

is particularly preferred.

As the above-mentioned aromatic acid anhydride, there are included tetravalent aromatic acid anhydrides, and the like. Particularly useful as said tetravalent aromatic acid are organic groups illustrated as the above-mentioned $R_o$. They can be used alone or in combination. Also useful are acid anhydrides wherein one or more kinds of groups among an alkyl group, an alkyl fluoride group, an alkoxy group, an alkoxy fluoride group, an acyl group, and a halogen group is combined with an aromatic ring. Moreover, it is preferable to employ an acid anhydride with an aromatic ring linked by flexible combination with ether, ketone, and the like in order to improve adhesiveness. Particularly, it is preferable to use acid anhydride of the following structure:

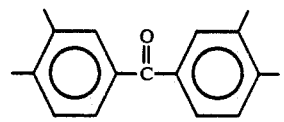

As the above-mentioned aromatic diamine, there are the same diamine mentioned as the components of said aromatic polyimide supporting film. Particularly, among $R_1$ of the above-mentioned general formula (2), and (3), diamine wherein one or more kinds of groups among an alkyl group, an alkyl fluoride group, an alkoxy group, an alkoxy fluoride group, an acyl group, and a halogen group is combined with an aromatic group can be used. To improve adhesiveness of the hardened polyimide, it is preferable to employ diamine with an aromatic ring linked at a meta position by flexible combination with ether, ketone, and the like. Particularly, the following diamine is preferred:

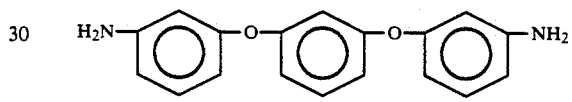

Moreover, the above-mentioned aromatic diamine may be mixed with a siloxane diamine of the formula

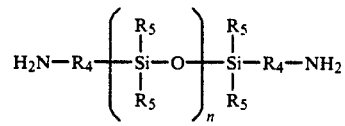

wherein $R_4$ is an alkylene group with 1 to 20 carbon atoms, an alkylene fluoride group, an alkyl ($C_1$-$C_{10}$) aryl group, or a phenylene group, $R_5$ an alkyl group with 1 to 10 carbon atoms, an alkyl fluoride group, or a phenyl group, and n is an integer 3 to 20. More preferably, $R_4$ is a methylene group, a propione group, a hexafluoropropylene group, or a phenylene group, $R_5$ a methyl group, a trifluoromethyl group, or a phenyl group, and n is an integer 8 to 14. In this case, it is preferable to set the mixing ratio of said siloxane diamine at 1 to 30% to said aromatic diamine.

In general, the acetylene terminated polyimide and polyisoamide adhesives used to form the adhesive layer are prepared as follows. Approximately chemical equivalents of aromatic acid anhydride, aromatic diamine, and ethynylated aromatic amine are reacted in the organic solvent, and powdery adhesive is obtained which is changed to imide according to the conventionally known procedure. Solution for application is prepared by dissolving the powdery adhesive in ethers such as diglyme (diethyleneglycoldimethylether, boiling point of 162° C.).

As solvent to dissolve the above-mentioned powdery adhesive, it is preferable to use a solvent which is easy to evaporate when the solution is dried, and has smaller affinity to the cured adhesive so that voids are not formed in the cured adhesive. Suitable solvents are, for example, monoglyme (ethylene-glycoldimethylether, boiling point of 85° C.), and the like other than the above-mentioned diglyme. It is preferable to set concentration of the abovementioned solution for application at the low concentration of 0.1 to 10%, and it is preferable to set the high concentration of 30 to 60% when the solution is used as adhesive itself. Conventional fillers may also be used in amounts of 0.1 to 500% by weight of the resin component. It is particularly preferable at 30 to 200% and more preferable at 40 to 150% when a grain diameter of the filler is small.

Suitable acetylene terminated polyimides for uses herein are discussed in U.S. Pat. Nos. 3,845,018; 3,879,349; 4,108,836; 4,438,273; and 4,485,231, the disclosures of which are incorporated herein by reference.

Suitable acetylene terminated polyimides and polyisoamides may be obtained from National Starch and Chemical under their Thermid tradenames. Specific materials are the polyimides of formula 4 available under the Thermid MC-600 materials are the polyimides of formula 4 available under the Thermid MC-600 tradename:

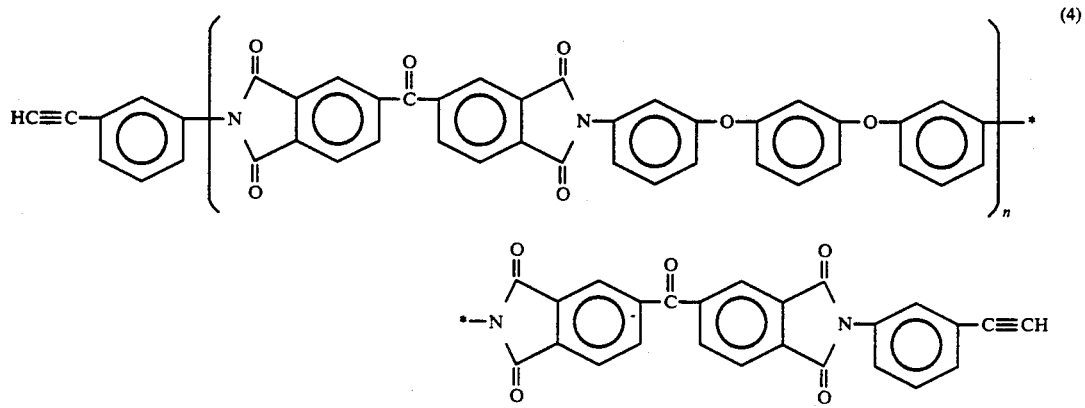

(4)

Polyisoamides of formula 5 available under the Thermid IP-6XX tradename:

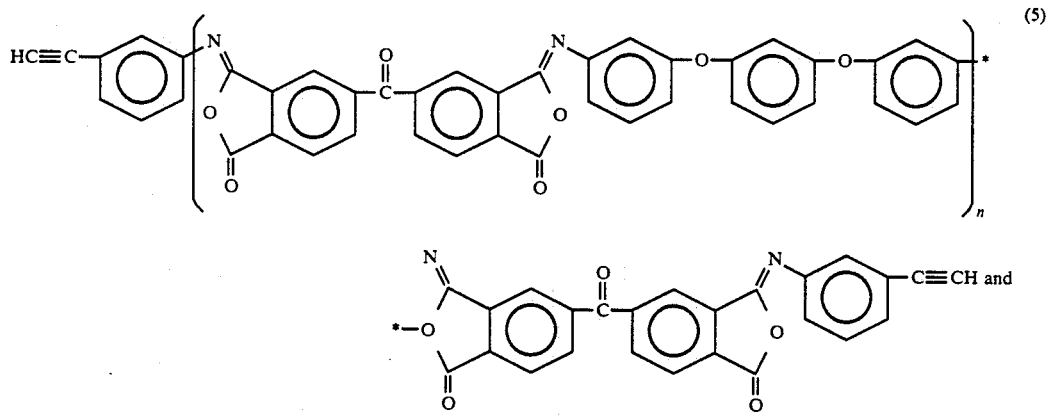

(5)

Fluoride containing polyimides of formula 6 available under Thermid FA-7XX tradename:

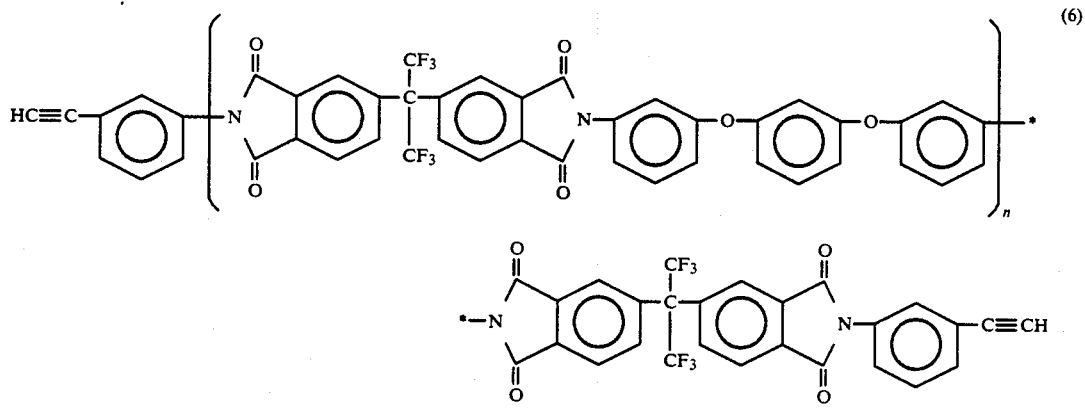

(6)

In the above-mentioned structural formulas, n is an integer 0 to 100, and the smaller n is, the higher a bridging degree and Tg of the hardened. As n is bigger, the bridging degree decreases, and Tg lowers a little, but said polyimide added with acetylene at both ends spreads better. When it is to be used as adhesive, it is preferable to set n at 0 to 10 for shearing resistance, and particularly preferable at 0 to 5, and when it is preferable to set n at 10 to 100 for peeling resistance, and particularly preferable at 15 to 100.

Heat resistant adhesive materials according to the present invention may be prepared as follows. The polyimide precursor solution is spread and applied at the desired thickness on one side of the aromatic polyimide supporting film prepared as above, using a barcoater, applicator and the like, and dried to form a two-layer heat resistant adhesive material. Three-layer heat resistant adhesive materials wherein the acetylene terminated polyimide layer is formed on the both sides of the aromatic polyimide supporting film is obtained by spreading an acetylene terminated polyimide adhesive layer on the other side of the abovementioned heat resistant adhesive material formula according to the abovementioned procedure. In this case, as the condition for the above-mentioned drying, it is preferable that isoamide in polyimide precursor solution is not converted to imide, and organic solution can be evaporated as much as possible without reacting acetylene groups. It is preferable to set a temperature at 130 to 140° C., for example.

The thickness of the acetylene terminated polyimide adhesive layer of heat resistant material adhesive obtained as mentioned above varies according to the nature of the adherent. When the adherend is flat, the thickness is set so that the flat is covered evenly; when the adherend has difference in level just as in electric circuits and the like, the thickness is decided by adding the height of protruding parts to the above-mentioned thickness for the flat adherend. Practically, it is preferable to decide the thickness by adding thickness of 2 to 50 μm to the height of protrusion.

As adhering methods employing heat resistant adhesive material of the present invention, a method for adherends of comparatively large area such as multichip module and various kinds of hybrid integrated circuits, and a method for adherends of comparatively small area such as lead frames are to be described hereinafter.

For adherends of comparatively large area, a heat presser or the like are employed, and a large quantity of adherends are adhered at once in batch-like processing. That is, a large quantity of the heat resistant adhesive material is heated uniformly at first, and the resin is melted by heating. Heating is then continued to crush any bubbles which are produced from air or residual volatile matter during hardening and to fill the surface of the adherend uniformly with melted resin. Pressure, which is higher than vapor pressure of volatile matter produced during hardening, and high enough to be able to make close adherence to the adherend without lifting at least, is required, and whole adherend is pressed uniformly with cushion material such as Teflon ® sheet put between the adherend and a heat presser. The temperature is raised to react endacetylene groups of the acetylene terminated polyimide adhesive layer completely. More specifically, the temperature of the adherend is raised from 130° C. to higher temperature, and the adherend is pressed at a temperature of 180° C. by the heat presser and the like. The adherend is continued to be heated, and kept at a temperature of 220° C. for 15 to 30 minutes to gelate resin, and then, the resin is hardened by being heated to a temperature of 260° C. and held in that state for 15 to 120 minutes. Then after-hardening is conducted without pressing in a dehydrator to obtain desired Tg as the need arises.

For adherends of comparatively small area, heat resisting adhesive material of the present invention is preheated to a temperature of 130° to 140° C., so that end-acetylene groups do not react, to thereby volatilize residual solution. The preheated adherend is then adhered closely for 30 seconds to a hot plate heated to a temperature of 350° C. to gelate oligomer by reacting end-acetylene groups at high temperature for short time. Next, after-hardening is conducted in the dehydrator at a temperature of 300° C. for an hour.

Further, when heat resistant adhesive material of the present invention is employed for semiconductor devices, adherence can be conducted by filling difference in level of the adherend. Compared to heat resisting adhesive material to which liner heat resistant adhesive is applied, heat resistant adhesive material of the present invention has advantages which are, an adhesive layer wherein the main component is polyimide terminated with acetylene at both ends is melted during adhering (heating and hardening), and it is possible to adhere at low pressing pressure and to contribute to improvement of reliability of electronics by its perfect filling of the parts which have difference in level. Further, since the adhesive layer can be made thin because parts which have difference in level are coated and filled, the multilayer substrates can be made more compact.

The following examples and a comparative example are further illustrative of the present invention.

EXAMPLES 1-4

Each acetylene terminated polyimide adhesive shown in below-mentioned Table 1 was dissolved in diglyme (diethyleneglycoldimethylether, boiling point of 162° C.), and four kinds of 30% solution were prepared. Next, a sheet of aluminum foil was put down on each of four aluminum plates (300 mm × 300 mm × 2 mm by thickness), and each aromatic polyimide supporting film shown in the belowmentioned table, which had been cut to the pieces (200 mm × 250 mm), was spread on the above-mentioned plates evenly, and fixed by cellophane tape. And, each of the above-mentioned 30% solution was applied by using Barcoater No. 20 so that thickness of the layers after being dried was to be 10 μm. Then, those were put in a dehydrator with a temperature of 500° C., heated to 130° C., and held for 30 minutes, and heat resistant adhesive materials with acetylene terminated polyimide adhesive layers formed on one side of the aromatic polyimide supporting films were obtained. Heat resistant adhesive materials with application on one side in below-mentioned Table 1 were used for peeling tests.

TABLE 1

| Example No. | Adhesive | Polyimide Supporting Film | Side of Application |
|---|---|---|---|
| 1 | IP-600 *1 | Kapton *3 | One side |
| 2 | FA-700 *2 | Kapton *3 | One side |
| 3 | IP-600 *1 | Apikal AH *4 | One Side |

TABLE 1-continued

| Example No. | Adhesive | Polyimide Supporting Film | Side of Application |
|---|---|---|---|
| 4 | IP-600 *1 | Apika1NPI *5 | One Side |

*1 Thermid IP-600 (isoimide type), product of National Starch and Chemical Company
*2 Thermid FA-700 (fluoride type), product of National Starch and Chemical Company
*3 Kapton100H (25 μm by thickness), product of Du Pont
*4 Apika1AH (25 μm by thickness), product of Kanegafuchi kagakukogyo
*5 Apika1NPI (25 μm by thickness), product of Kanegafuchi kagakukogyo

EXAMPLES 5 to 10

By following the same process as that in the above-mentioned examples, heat resistant adhesive materials with acetylene terminated polyimide adhesive layers in below-mentioned Table 2 formed on both sides of the aromatic polyimide supporting films in the below-mentioned Table 2 were obtained. Heat resistant adhesive materials with application on both sides in below-mentioned Table 2 were used for shearing tests.

TABLE 2

| Example No. | Adhesive | Polyimide Supporting Film | Side of Application |
|---|---|---|---|
| 5 | IP-600 *1 | Kapton *3 | Both sides |
| 6 | FA-700 *2 | Kapton *3 | Both sides |
| 7 | IP-600 *1 | UpilexR *4 | Both sides |
| 8 | IP-600 *1 | UpilexS *5 | Both sides |
| 9 | IP-600 *1 | Apika1AH *6 | Both sides |
| 10 | IP-600 *1 | Apika1NPI *7 | Both sides |

*1 Thermid IP-600 (isoimide type), product of National Starch and Chemical Company
*2 Thermid FA-700 (fluoride type), product of National Starch and Chemical Company
*3 Kapton100H (26 μm by thickness), product of Du Pont
*4 UpilexR (50 μm by thickness), product of Ubekosan
*5 UpilexS (50 μm by thickness), product of Ubekosan
*6 Apika1AH (25 μm by thickness), product of Kanegafuchi kagakukogyo
*7 Apika1NPI (25 μm by thickness), product of Kanegafuchi kagakukogyo

Preparation of test pieces for shearing tests and shearing tests

Surfaces of adherends (25 mm × 100 mm) which are soft steel, 42 alloy, copper, and SUS304 shown in Table 3 and Table 4 were degreased by acetone. Heat resistant adhesive material with application on both sides was cut to pieces so that area for adherence of each piece was to be 25 mm × 13 mm, sandwiched between the above-mentioned adherends in order to be adhered, and tightened by a clamp using Teflons ® containing glass fiber as cushioning and pressing material when heating and hardening. Next, they were put in a dehydrator with a temperature of 130° C., heated to a temperature of 220° C. in 15 minutes, and held for 15 minutes to be hardened. Then, after taking off the clamp, after-hardening was conducted at a temperature of 260° C. for an hour and half, and shearing test pieces were prepared. Those pieces were put in a thermostatic box, heated to the predetermined temperature, and after 5 minutes, shearing tests were conducted following the well-know process. The results are shown together in Table 3 and Table 4. Further, in the shearing tests, pull rate of the measure was 2 mm/seconds, unit was kgf/cm$^2$, and a value was an average value of three measures.

SHEARING TESTS–EXAMPLE 5

TABLE 3

| Kind of Adherends | Kind of Environment Resistant Tests | Measuring Temperature | Strength | State of Break *3 |
|---|---|---|---|---|
| Soft steel *1 | — | 20° C. | 183 | A |
| Soft steel *1 | — | 260° C. | 64 | B |
| Soft steel *1 | 300° C. for 1 hour + 380° C. for 15 minutes | 260° C. | 36 | B |
| Soft steel *1 | 316° C. for 16 hours | 260° C. | 66 | B |
| Soft steel *1 | 260° C. for 1000 hours | 20° C. | 170 | A |
| Soft steel *1 | 260° C. for 1000 hours | 260° C. | 54 | B |
| Soft steel *1 | soaked in boiled water for 8 hours | 20° C. | 132 | A |
| 42 alloy | — | 20° C. | 183 | A |
| 42 alloy | — | 260° C. | 64 | B |
| 42 alloy | soaked in boiled water for 8 hours | 20° C. | 132 | A |
| Copper *2 | — | 20° C. | 62 | A |
| Copper *2 | soaked in boiled water for 24 hours | 20° C. | 58 | B |
| Copper *2 | soaked in boiled water for 72 hours | 20° C. | 49 | B |
| Copper *2 | soaked in boiled water for 10 days | 20° C. | 55 | B |
| SUS304 | — | 20° C. | 190 | A |
| SUS304 | soaked in boiled water for 24 hours | 20° C. | 58 | B |
| SUS304 | soaked in boiled water for 72 hours | 20° C. | 41 | B |
| SUS304 | soaked in boiled water for 10 days | 20° C. | 72 | B |

*1 JIS G-3141
*2 JIS K-6850
*3 A reference symbol A is a state wherein polyimide supporting film is broken, B a state between peeling at interface of polyimide supporting film and an adhesive layer, and breaking of polyimide supporting film.

TABLE 4

| | Kind of Adherends | Kind of Environment Resistant Tests | Measuring Temperature | Strength | State of Break *2 |
|---|---|---|---|---|---|
| Example No. 6 | Soft steel *1 | — | 20° C. | 120 | A |
| | Soft steel *1 | — | 260° C. | 70 | A |
| | Soft steel *1 | 260° C. for 1000 hours | 20° C. | 148 | A |
| | Soft steel *1 | 260° C. for 1000 hours | 260° C. | 65 | B |
| | Soft steel *1 | soaked in boiled water for 8 hours | 20° C. | 132 | A |
| Example No. 7 | Soft steel *1 | — | 20° C. | 213 | A |
| | Soft steel *1 | — | 260° C. | 70 | B |
| | Soft steel *1 | 300° C. for 1 hour + 380° C. for 15 minutes | 260° C. | 87 | B |
| | Soft steel *1 | 316° C. for 16 hours | 260° C. | 68 | B |
| | Soft steel *1 | soaked in boiled water for 8 hours | 20° C. | 161 | A |
| Example No. 8 | Soft steel *1 | — | 20° C. | 110 | C |
| | Soft steel *1 | — | 260° C. | 53 | C |
| | Soft steel *1 | 300° C. for 1 hour + 380° C. for 15 minutes | 260° C. | 41 | C |
| | Soft steel *1 | 316° C. for 16 hours | 260° C. | 80 | C |
| | Soft steel *1 | soaked in boiled water for 8 hours | 20° C. | 95 | C |

TABLE 4-continued

|  | Kind of Adherends | Kind of Environment Resistant Tests | Measuring Temperature | Strength | State of Break *2 |
|---|---|---|---|---|---|
| Example No. 9 | Soft steel *1 | — | 20° C. | 165 | A |
|  | Soft steel *1 | — | 260° C. | 81 | A |
|  | Soft steel *1 | soaked in boiled water for 8 hours | 20° C. | 162 | A |
| Example No. 10 | Soft steel *1 | — | 20° C. | 165 | A |
|  | Soft steel *1 | — | 260° C. | 94 | A |
|  | Soft steel *1 | soaked in boiled water for 8 hours | 20° C. | 158 | A |

*1 JIS G-3141
*2 A reference symbol A is a state wherein polyimide supporting film is broken, B a state between peeling at interface of polyimide supporting film and an adhesive layer, and breaking of polyimide supporting film, and C a state of peeling at interface of polyimide supporting film and an adhesive layer.

From the above-mentioned results, as shown in Table 3 and Table 4, it was found that examples were firmly adhered to the adherends in all the environment resistant tests, and had high adhesive strength.

Preparation of test pieces for peeling tests and peeling tests

Surfaces of adherends (25 mm × 100 mm) which are soft steel, 42 alloy, copper, and SUS304 shown in Table 5 and Table 6 were degreased by Acetone. Heat resistant adhesive material with application on one side was cut to pieces a little larger so that area for adherence of each piece was to be 25 mm × 25 mm saving the area to be pulled for peeling tests, and each piece was put on the above-mentioned adherends, and Teflon ® was put on them so that the adherends can be released later. Moreover, the adherends were put on the Teflon ®. Those adherends were not to be adhered. They were then tightened by a clamp. Next, they were put in a dehydrator with a temperature of 130° C., heated to a temperature of 220° C. in 15 minutes, and held for 15 minutes to be hardened. Then, after taking off the clamp, after-hardening was conducted at a temperature of 260° C. for an hour and half, and peeling test pieces were prepared. Employing those test pieces, peeling tests were conducted following the well-known process. The results are shown together in Table 5 and Table 6. As the peeling test, one-eighty degree peeling test was adopted, width was 25 mm, and pull rate was 50 mm/minute.

PEELING TESTS USING EXAMPLE NO. 1

TABLE 5

| Kind of Adherends | Kind of Environment Resistant Tests | Measuring Temperature | State of Break *3 |
|---|---|---|---|
| Soft steel *1 | — | 20° C. | A |
| Soft steel *1 | 260° for 1000 hours | 20° C. | A |
| 42 alloy | — | 20° C. | A |
| 42 alloy | 260° C. for 1000 hours | 20° C. | A |
| 42 alloy | soaked in boiled water for 24 hours | 20° C. | A |
| 42 alloy | soaked in boiled water 72 hours | 20° C. | A |
| 42 alloy | soaked in boiled water 10 days | 20° C. | A |
| Copper *2 | — | 20° C. | A |
| Copper *2 | soaked in boiled water 24 hours | 20° C. | A |
| Copper *2 | soaked in boiled water 72 hours | 20° C. | A |
| Copper *2 | soaked in boiled water 10 days | 20° C. | A |
| SUS304 | — | 20° C. | A |
| SUS304 | 260° C. for 1000 hours | 20° C. | A |
| SUS304 | soaked in boiled water 24 hours | 20° C. | A |
| SUS304 | soaked in boiled water 72 days | 20° C. | A |
| SUS304 | soaked in boiled water 10 days | 20° C. | A |

*1 JIS G-3141
*2 JIS K-6850
*3 A reference symbol A is a state wherein Kapton film is broken.

TABLE 6

| Kind of Adherends | Kind of Environment Resistant Tests | Measuring Temperature | State of Break *2 |
|---|---|---|---|
| Example No. 2 | | | |
| Soft steel *1 | — | 20° C. | A |
| Soft steel *1 | 260° C. for 1000 hours | 20° C. | A |
| Soft steel *1 | soaked in boiled water for 8 hours | 20° C. | A |
| Example No. 3 | | | |
| Soft steel *1 | — | 20° C. | A |
| Soft steel *1 | 260° C. for 1000 hours | 20° C. | A |
| Soft steel *1 | soaked in boiled water for 8 hours | 20° C. | A |
| Example No. 4 | | | |
| Soft steel *1 | — | 20° C. | A |
| Soft steel *1 | 260° C. for 1000 hours | 20° C. | A |
| Soft steel *1 | soaked in boiled water for 8 hours | 20° C. | A |

*1 JIS G-3141
*2 A reference symbol A is a state wherein Apikal film is broken.

The results of Table 5 and Table 6, show that the samples were firmly adhered to the adherends, and film was broken in the peeling tests, which made it impossible to measure adhesive strength between the adhesive layers and the adherends.

COMPARATIVE EXAMPLE

Employing polyamic acid adhesive (LARC-TPI solution, product of Mitsuitoatsu) which is heat resistant adhesive conventionally in use, shearing tests were conducted using soft steel (JIS G-3141) as adherends following the 7 with conditions for adherence.

Temperature was fixed at 350° C., and each adherend was adhered using a clamp for pressing.

TABLE 7

| Conditions for Pressing | Heat Pressing (50 kgf/cm²) | Clamp | Double Clip | Gem Clip |
|---|---|---|---|---|
| Adhesive strength | 250 | 44 | 19 | 7 |

From the results of Table 7, it is seen that comparative examples were firmly adhered in condition of high temperature and high pressure, but high adhesive strength could not be obtained in a simple adherence process (by low pressure).

What is claimed is:

1. A heat resistant adhesive material which comprises an aromatic polyimide supporting film wherein the main component of the film is a repeating unit of the general formula:

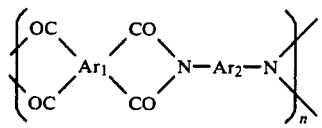
(1)

where $Ar_1$ is an aromatic tetracarboxylic acid residue, $Ar_2$ an aromatic diamine residue, and n is an integer 1 or greater; at least one side of which is coated with an adhesive layer wherein the main component of the adhesive is an acetylene terminated polyimide of the formula:

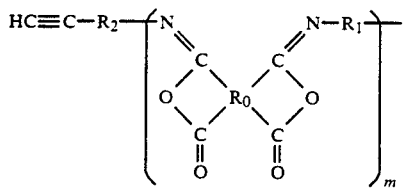
(2)

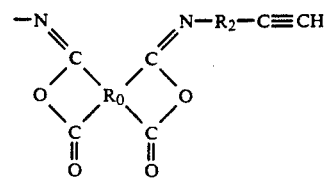

wherein $R_o$ represents tetravalent organic groups, $R_1$ and $R_2$ divalent organic groups, and m is an integer 0 to 100.

2. The heat resistant adhesive material of claim 1 wherein $R_o$ in the acetylene terminated polyimide of formula (2) is

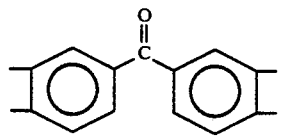

$R_1$ is

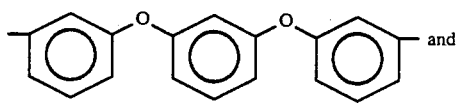 and $R_2$ is 

and $R_2$ is

3. The heat resistant adhesive material of claim 1 wherein the polyimide supporting film is coated on one side with the acetylene terminated polyimide.

4. The heat resistant adhesive material of claim 1 wherein the polyimide supporting film is coated on both sides with the acetylene terminated polyimide.

* * * * *